April 8, 1941.  A. RONNING  2,237,579
LIGHT-SENSITIVE RELAY SYSTEM
Filed July 1, 1938  3 Sheets-Sheet 1
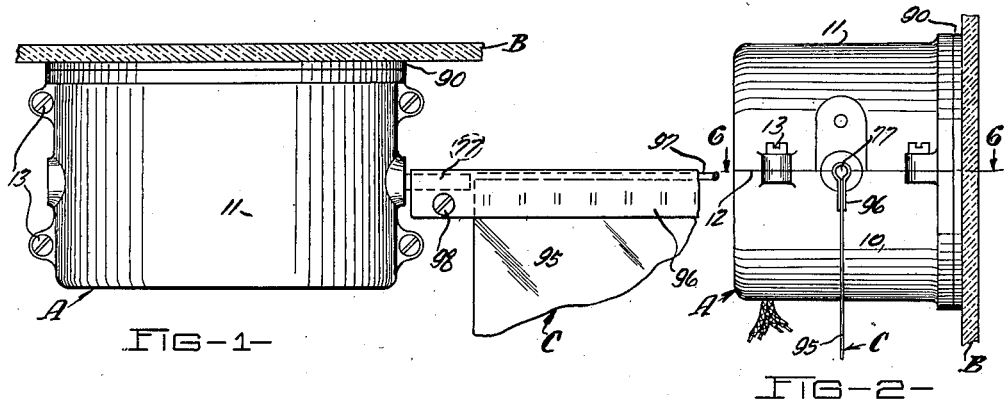
Fig-1-  Fig-2-
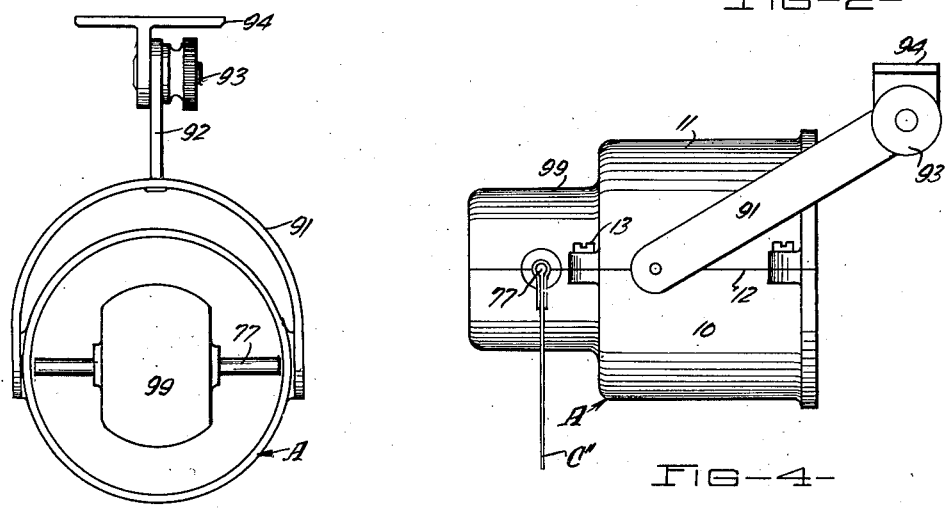
Fig-3-  Fig-4-
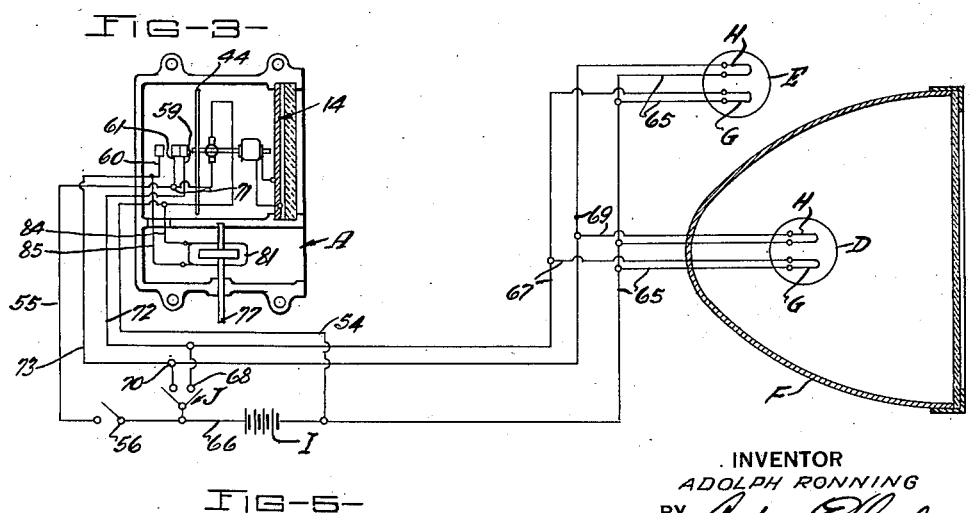
Fig-5-
INVENTOR
ADOLPH RONNING
BY Andrew E. Carlsen
ATTORNEY

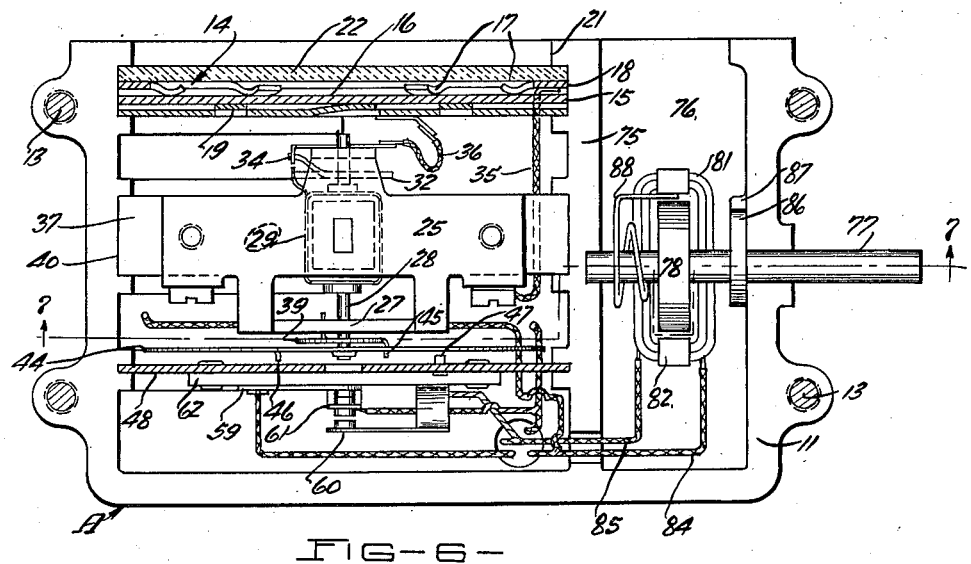
FIG-6-
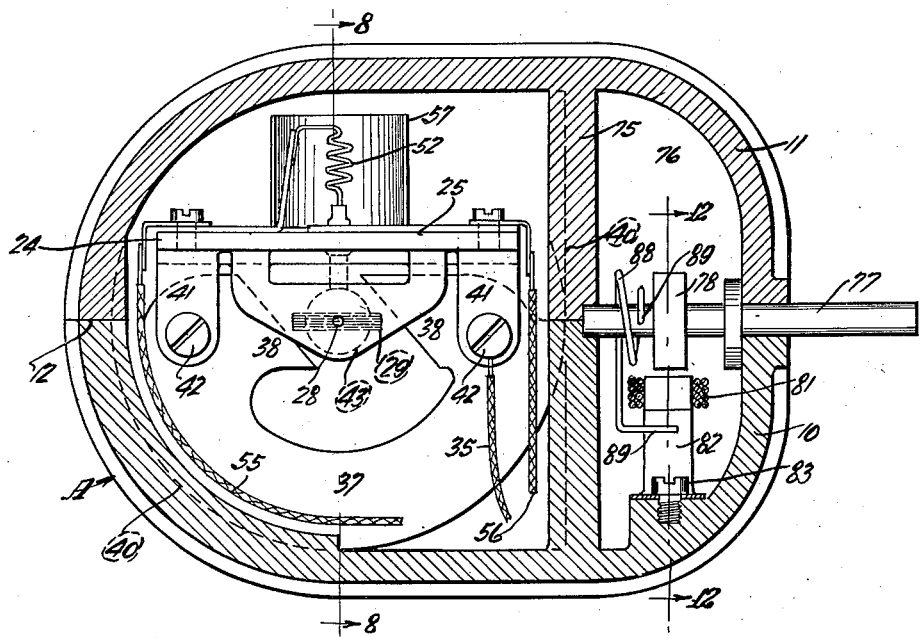
FIG-7-
INVENTOR
ADOLPH RONNING
BY Andrew E. Carlsen
ATTORNEY

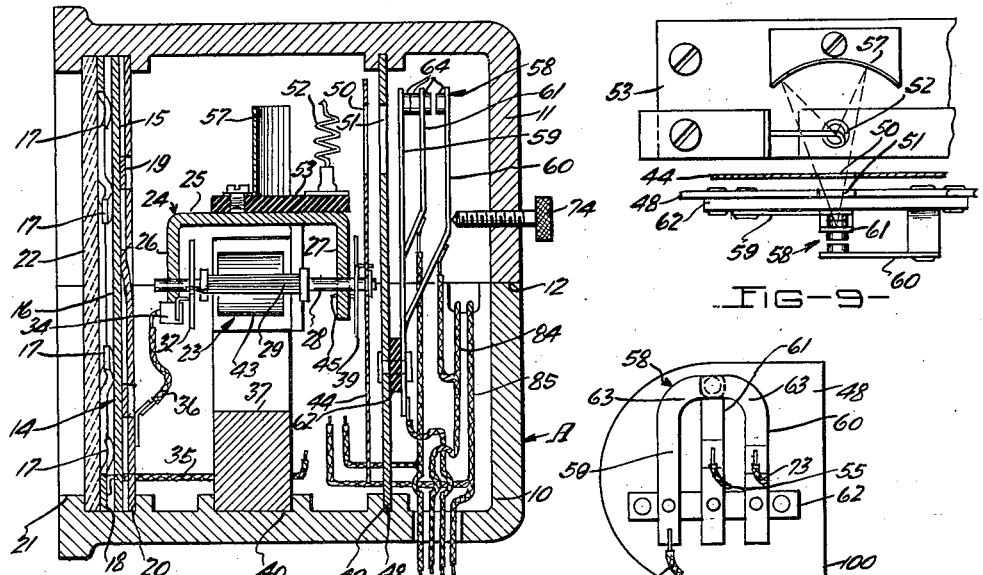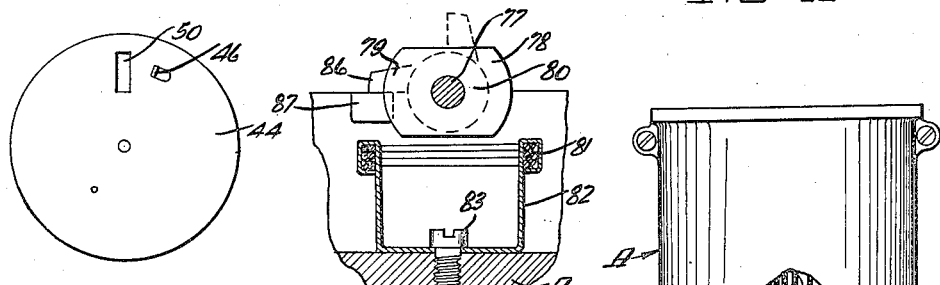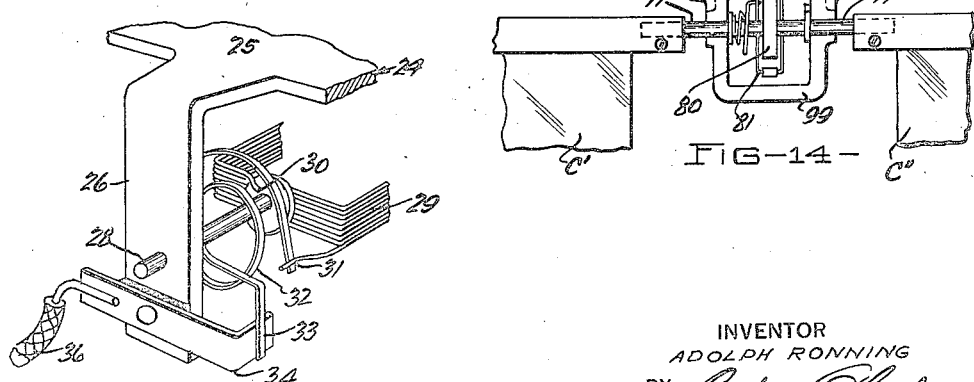

Patented Apr. 8, 1941

2,237,579

UNITED STATES PATENT OFFICE 2,237,579

LIGHT-SENSITIVE RELAY SYSTEM

Adolph Ronning, Minneapolis, Minn.

Application July 1, 1938, Serial No. 216,984

8 Claims. (Cl. 250—41.5)

This invention relates to automatic light control apparatus for vehicles.

It is the primary object of my invention to provide an apparatus by the use of which the headlights of a vehicle may be automatically dimmed under control of, or in response to, light rays from another vehicle or other source, thus carrying out the operation necessary for the safety and convenience of other drivers; but which in addition provides a safety feature for the driver of the equipped vehicle, by the simultaneous movement of a glare shield or translucent visor into the position for protecting the driver's eyes against glare from the light rays. This operation is entirely automatic and comes into play only when light rays are encountered which are of sufficient intensity to "blind" the driver, and the headlights are immediately restored to full brilliancy and the visor moved out of the line of vision when the vehicle moves out of the field of the offending light.

Another object of the present invention is to provide numerous improvements over the device disclosed in my prior patent, for Automatic headlight dimmer, No. 1,999,527, issued April 30, 1935, to the end that a more efficient and practical, as well as considerably less expensive, dimming control apparatus may be had, in addition to the entirely novel glare shield or visor control feature described.

Another object is to improve on devices of this nature to the end that an extremely durable and practical assembly may be had, and one which will not be rendered ineffective by the almost continuous vibration to which it is necessarily subjected in its use upon a vehicle.

These and other more detailed and specific objects will be disclosed in the course of the following specification, reference being had to the accompanying drawings, in which—

Fig. 1 is a plan view of the apparatus, showing the same as applied by an adhesive washer to a fragment of windshield, and showing a fragment of the visor or glare shield in raised or inoperative position.

Fig. 2 is a side view of the same assembly, but showing the glare shield swung downwardly to operative position.

Fig. 3 is a rear elevation of an apparatus of similar kind but adapted for operation of two separate glare shields and showing a bracket and hanger mounting assembly in lieu of the adhesive washer.

Fig. 4 is a side view of the assembly shown in Fig. 3.

Fig. 5 is a diagrammatic showing of the apparatus and illustrating the various circuit connections with the headlights, battery, and switches.

Fig. 6 is an enlarged view taken along the line 6—6 in Fig. 2, the windshield being omitted and the casing cover removed to disclose interior parts.

Fig. 7 is a cross section along the irregular line 7—7 in Fig. 6.

Fig. 8 is a cross section along the line 8—8 in Fig. 7.

Fig. 9 is a fragmentary plan view of the heating coil, reflector, and heat controlled relay or switch, showing the shutter in cross section.

Fig. 10 is a rear elevation of the heat controlled relay or switch alone, with its mounting plate.

Fig. 11 is an elevation, to the same scale as Fig. 1, showing the shutter or control disk alone.

Fig. 12 is a fragmental section taken along the line 12—12 in Fig. 7.

Fig. 13 is an enlarged fragmentary perspective view showing portions of the shutter control motor, its frame, and the electrical connections to the former.

Fig. 14 is a plan view, partially broken away showing the apparatus of Figs. 3 and 4, for controlling two visors, which are themselves shown but fragmentally.

Referring now more particularly and by reference characters to the drawings, my invention is seen to comprise a housing or unit A adapted to be supported in suitable manner adjacent the windshield B of the vehicle which is to be equipped with the protective apparatus, and in such position that it may control the glare shield or visor C (or the two similar elements C'—C'') to move it into position in the line of sight of the driver. Also the unit serves to control the lamps D and E which are located in the usual headlights (only one of which is shown, at F) to energize either the "bright" filaments G or the "dim" filaments H. These filaments are at present energized from the battery I under control of the usual three position switch J, but these circuits as well as other connections therewith will be presently more fully described. Attention is also invited to my prior patent hereinbefore identified for comparative purposes, the essential dimming and manual control circuits disclosed in that patent being quite similar to that shown herein in Fig. 5.

The operating elements and controls may be conveniently divided into three groups and designated as the primary control which is sensitive to light rays from approaching vehicles or other foreign sources; the secondary control which is subject to the control of the primary device and is heat energized to actuate the dimming circuit; and finally the tertiary control which is current sensitive and responsive to operation of the dimming control to actuate the glare shield or visor. These assemblies will be described in detail in the order given.

The housing or unit A comprises a two part molded or cast housing, preferably of some plastic having insulating properties, and comprises the body or base portion 10 and the cover or cap portion 11 which meet along a medial line 12 and are detachably connected by screws 13. In actual practice the parts will be assembled and wired in the body portion 10 and then completely enclosed by putting the cover 11 in place, this feature facilitating both initial assembly work as well as subsequent inspection or repair, as will be apparent.

The primary or light sensitive control, of course, includes as its basic element a light sensitive cell 14 which in this case preferably takes the form of a well known type embodying a disk 15 having an oxidized film or coating at 16 on its frontal face. Contact with this coated face is made at several points by arcuated fingers 17 pressed from a contact ring 18 and similar contact is had at the rear face of the disk by fingers 19 punched from a rear contact disk 20. This type of unit is self-generating and has the property of setting up minute electrical energy or current between the ring 18 and disk 20 when the coated face of the disk 15 is exposed to light rays. The assembly is mounted, therefore, at the frontal end of the case A at the opening 21, and the disk 15 is protected by a transparent glass lens 22 so that light rays may enter and strike the disk.

The current or electromotive force set up by the element 14 is employed to energize a shutter motor or movement designated generally at 23 and which comprises a frame or bracket 24 pressed from sheet metal to form a flat base portion 25 and spaced bearing ears 26 and 27 which are apertured to rotatably receive the shaft 28. This shaft carries a coil or winding 29 of wire, one end of which is connected or "grounded" at 30 to the shaft and the other end of which is connected at 31 to a fine hair spring 32 which acts as a feeder for the coil and is connected at 33 to a terminal 34 secured to, but insulated from, the said ear 26. Wires 35 and 36 connect the contact ring 18 and contact disk 20 to the frame 24 and terminal 34, and the circuit is thus such that the current set up by the element 14 when exposed to light, is carried to the coil 29 where it sets up a magnetic field thereabout as will be apparent. This magnetic field cuts the field about a permanent magnet 37 between the poles 38 of which the coil is arranged, and the resultant attraction and repulsion between these fields cause the coil 29 and consequently the shaft 28 to be rotated a part turn in one direction. The parts retain this position so long as the element 14 is exposed to light but immediately return to initial position when the light rays are cut off, under influence of a hair or spiral spring 39.

The permanent magnet 37 is substantially horseshoe shaped, rests in grooves 40 in the body 10, and the frame is retained in place on the magnet by apertured tabs 41 which are secured by screws 42 thereto. The shaft 28 carries a soft iron block 43 within the coil 29 which stands at all times equally spaced between the magnet poles 38 to act, to a considerable extent at least, as a keeper and prevent the loss of magnetism in the magnet.

The shaft 28 carries a disk or shutter 44 at its rear end and this shutter is of light metal secured rigidly to the shaft to rotate therewith. The aforesaid spring 39 has its ends 45 connected to the shutter 44 and the adjacent ear 27 so that it acts to normally retain the assembly of shaft, coil and shutter in an initial or inoperative position. The motion of the parts when the coil is energized is limited by contact of a stop lug 46 pressed from the shutter 44, and which contacts a stop pin 47 provided on a partition wall or guard plate 48 secured in grooves 49 in the body 10 immediately to the rear of the shutter. In this position, then, an opening 50 in the shutter 44 is aligned with an opening 51 in the plate 48, for a purpose to be described.

As stated heretofore, the secondary apparatus, or dimmer control means, is heat energized and this apparatus is mounted in part forwardly and in part rearwardly of the guard plate 48 so that this plate may act as a means for normally preventing the heat on one side from reaching the heat responsive means on the other side. For this reason the plate is made of a heat insulating material of a suitable kind. The heat source takes the form of a resistance coil or filament 52 of resistance wire mounted atop the frame 24 on an insulating base 53 secured thereto, and which is connected by wires 54 and 55 to the battery I. A master switch 56 is interposed in the wire 55 to control the energization of the heating element. This arrangement of the parts places the heating coil 52 in such position that the heat radiated thereby may pass through the opening 51 in the guard plate 48, and so enter the compartment to the rear of the plate, but only when the shutter 44 has been moved to a position at which the shutter opening 50 is aligned with the opening 51. The heat is reflected and concentrated in a beam through these openings by means of a suitably shaped reflector 57 secured to the base 53, and the shutter 44, responsive to operation of the light sensitive means, is thus seen to control the admission of the beam of radiant heat to and through the opening 51, to the end that heat can only pass through the opening when light rays are striking the light sensitive element 14.

The guard plate 48, in addition to its function as a heat insulating wall, also serves as a mounting for a heat actuated relay or thermal switch 58 which includes relatively rigid spaced contact arms 59 and 60 and an intermediate movable switch arm 61, all of which are secured to a block 62 of electrical insulation on the rear face of the plate. The arms 59 and 60 are spaced apart laterally or transversely (see Fig. 10) so that the intermediate switch arm 61, which extends vertically, falls immediately behind the opening 51 and thus has a substantial area exposed to the heat beam entering through that opening. The upper ends of the arms 59 and 60 are then turned inwardly at 63 so that the contacts 64 carried by the arms may make electrical contact. Normally the arm 61 makes contact with the arm 59 under influence of an inherent tension and resiliency given the switch arm to move forwardly at its upper end, but this arm 61 is further made of a bimetallic or laminated construction in such manner that the application of heat will cause an unequal expansion and contraction causing the arm to bow back and move against the contact arm 60, leaving contact with the arm 69 in the process. The switch arm may, therefore, be caused to shift back and forth between the contact arms 59 and 60 by the application or withdrawal of heat, and the heat is supplied for this purpose by the coil 52 under control of the shutter 44.

The circuit connections and operation of the dimmer apparatus will now be described. The usual light switch J controls the operation of the light filaments G and H in usual manner. For this purpose one side of the circuit to the battery I is completed through wires 65 to the filaments, and the other side of the circuit from the battery I is made to the switch by the wire 66. The bright filaments G are then connected by wires 67 to one terminal 68 of the switch J, and the dim filaments H are connected by wires 69 to the other terminal 70 so that by closing the switch to contact either of these terminals, either the bright or dim filaments may be lighted at will.

My dimmer apparatus is subject primarily to the control of the master switch 56 which breaks the circuit between the battery I and coil 52 via the wires 54 and 55. Thus when the switch 56 is closed the heating coil will be energized and will radiate heat so long as the circuit remains in closed condition. The thermal switch or relay 58 is, in effect, paralleled or shunted across the manual switch J, and to this end the center or switch blade 61 is connected at 71 to the wire 55 and thence to the battery I through the switch 56. The contact arms 59 and 60 are then connected by wires 72 and 73 to the switch terminals 68 and 70, respectively, so that the contact 59 serves as bright light control, and contact 60 serves as dim light control. This completes the circuit necessary for the automatic dimming operation. The switch J is, of course, left in open position when automatic operation is desired and the bright filaments are lighted by contact between the arms 59 and 61.

Now, should the light sensitive element be exposed to the strong light rays of an oncoming vehicle or to street lights, the current induced in this element is transmitted to the coil 29 of the shutter operating means, causing the energization of the same and the resultant movement of the shutter 44 into a position at which the opening 50 permits the heat from the coil 52 to play upon the bimetallic switch arm 61. Immediately then this arm springs back, opening the bright light circuit by moving away from the arm 59 and closing the circuit to the dim filaments through engagement with the arm 60. This condition maintains as long as the light rays strike the light sensitive element, but instantly as the light is cut off, for any reason, the coil 29 is deenergized, the spring 39 returns the shutter 44 to starting position, the heat is cut off from the switch arm 61, and it returns to normal position, restoring the circuit to normal condition and lighting the bright filaments again. The operation is thus seen to be entirely automatic and wholly under control of the exterior offending light rays, once the master switch 56 has been closed to put the automatic control into operation.

The sensitivity of the device, or the rapidity with which the changeover from bright to dim and dim to bright light conditions is made, may be controlled by a screw 74 which is threaded through the back of the housing A and engages the contact arm 60 to move the same toward or away from the switch arm 61. The amount of movement necessary for this arm to go through in making the changeover may thus be readily adjusted, as may be required.

The foregoing apparatus affords protection to approaching drivers from glare from the headlights controlled by the device but, of course, gives the driver of the equipped vehicle no positive assurance of protection himself. For the protection of the driver employing the dimmer control I provide the tertiary apparatus now to be described. This apparatus is operated in conjunction, and simultaneously, with the thermal switch 58, and forms an extremely important part of the entire apparatus, as will be readily understood.

Referring to Figs. 1, 2, 6, 7, and 12, it will be noted that the housing A has a side wall or partition 75 extended straightly and vertically alongside the apparatus heretofore described, and which defines a separate chamber 76 in the housing. A visor operating shaft 77 is journaled through the exterior wall of the housing and into the wall 75, and extends transversely and laterally outward, as shown. Within the housing this shaft 77 carries a rigidly mounted permanent or bar magnet 78 having the opposite poles 79 and 80, and this magnet operates adjacent to a field coil 81 wound in and around a bracket 82 which is secured at 83 in the housing. This assembly thus forms a motor, movement, or operating means for visor control, as will presently appear. The field coil 81 is connected by wires 84 and 85 to the wires 54 and 73, respectively, and accordingly the coil will be energized only when the thermal switch 58 is in dim position, or the dim filaments are lighted, and at which time the circuit is completed between the coil and the battery I through the wires 84, 85, 54, and 55, and the arms 60 and 61. The effect of this energization of the field coil 81 is to set up a magnetic field which will combine with the field about the magnet 78 to cause a partial rotation of the magnet and the shaft 77, the extent of which is limited by a stop finger 86 carried by the shaft to contact a lug 87 formed on the adjacent inner side of the housing A. A light spiral hair spring 88 opposes this movement and serves to return the parts to initial or starting position when the coil 81 is deenergized. This spring is coiled around the shaft 77 and has its ends 89 connected to the shaft and the bracket 82.

For proper exposure to the light of oncoming vehicles the assembly must of course be directed forwardly, and a most convenient location is just within and near the upper edge of the windshield B of the vehicle, whereat the device is above the driver's line of vision. This position is, furthermore, necessary as will presently appear, and a very convenient mounting may be provided by the use of a rubber or other suitable gasket 90 over the front of the unit and which is coated with a suitable adhesive substance so as to retain the unit in place on the windshield, as shown in Figs. 1 and 2. In lieu of this arrangement, however, a mounting fork 91 may be releasably engaged at its ends with the unit and supported by a tang 92 and screw 93 to a bracket 94 screwed to a suitable supporting part of the vehicle. The latter arrangement has the advantage that the unit may be adjusted to various angles and may, in fact, be turned upwardly or back so that it is not exposed to light whenever its operation may not be desired.

However the unit is mounted, the shaft 77 is seen to extend out horizontally, and accordingly a visor or glare shield C may be secured to this shaft and operated thereby to move into, or out of, the driver's line of sight. The parts are so arranged that, in normal position the glare shield C will stand horizontally and rearwardly to give the driver an uninterrupted view of the road. Then, when bright lights are encountered and the lights are automatically dimmed, as hereinbefore described, the energization of the field coil 81 will cause a rocking movement of the shaft 77 such that the shield C will be swung quickly downward into a position where the driver may look through the shield at the road and so be protected from glare. As soon as the bright lights are passed the operation is immediately reversed, and the shield is moved back into the clear.

The glare shield C comprises a sheet of colored or translucent material 95 which may be conveniently retained at one edge in a folded back strip 96 and stiffened by the wire 97. One end of the back strip is then clamped by the screw 98 on the shaft 77 to secure the shield to the shaft. By minor rearrangement of the parts, as shown in Figs. 3, 4, and 14, the glare shield operating mechanism may be arranged in a rearward extension 99 of the housing A and the shaft 77 extended from the housing at both ends. A glare shield C'—C'' may then be mounted on each end of the shaft and, with the assembly centrally disposed over the windshield, both shields may be operated at the same time to thereby give protection to both the driver and a passenger seated beside him.

In connection with the various circuits involved, it will be noted that the wires 55 and 73 are shown, in Figs. 8 and 10, as connected to medial portions of the arms 60 and 61. This is for convenience in illustration only, and these wires would obviously be connected to the lower terminal ends of the parts as the connection is shown to arm 59.

The operation of the apparatus will, it is thought, be readily understood from the foregoing description, and it will be evident that I have provided a device which gives protection not only to the drivers of other vehicles, but also to the driver of the vehicle equipped with the apparatus. The apparatus may of course be used upon vehicles of all kinds whether land, water, or air, and also may find other uses where automatic glare protection may be desirable.

For convenience in initial assembly operations, as well as subsequent servicing, all parts are made to drop into place in the housing, and it will be noted in this connection that the plate 48 is necessarily straight along one edge 100 to fit the wall 75, and this feature tends to prevent the placing of this plate in a wrong position by an unskilled person. In fact, all parts are so arranged that they fit nicely into place but cannot be disarranged.

The apparatus is further of such nature that the vibration and road shocks to which it is subjected in use will have no effect on its operation. The use of the kinetic energy of heat radiated from the coil 52 as the operating force for the dimmer and glare shield control circuits greatly facilitates the construction of a shock-proof assembly, since it eliminates the requirement of delicate relays, vacuum tubes, or the like.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. Apparatus for controlling the energization of a plurality of separate circuits comprising, a heat sensitive relay connected in the circuits and normally closing a part thereof, and effective, in response to the application of heat, to open the previously closed circuits and close others, a source of heat for directing a beam of radiant heat to the relay and actuating the same, a movable cut-off device normaly interrupting the beam, and light sensitive means for moving the cut-off device out of the path of the heat beam when the said light sensitive means is subjected to light.

2. A device for controlling an electrical circuit, comprising a thermal switch connected in said circuit, a source of heat for actuating the switch, a rotary cut-off device normaly effective to shield the switch from the heat source, and light sensitive means for adjusting the cut-off device to a condition in which heat from the heat source will actuate the said switch.

3. A device for controlling an electrical circuit, comprising a heat sensitive switch connected in said circuit, a source of heat for actuating the switch, a member normally shielding the switch from said heat source but adjustable to expose the switch to the heat source, mechanism for adjusting said member, and light sensitive means for actuating said adjusting mechanism.

4. A device for controlling an electrical circuit, comprising a thermal switch connected in said circuit, a source of heat for directing a beam of radiant heat on said switch, a rotary shutter device interposed between the heat source and switch to normally interrupt said beam, the said shutter device having an opening adapted on rotation of the device to move into alignment with the path of the beam from heat source to switch, electrically operating mechanism for rotating said shutter device, and light sensitive means controlling the operation of the rotating mechanism.

5. A device for controlling an electrical circuit, comprising a heat sensitive switch connected in said circuit, a source of heat for directing a beam of radiant heat on said switch, a rotary shutter device interposed between the heat source and switch to normally interrupt said beam but rotatable to a position clearing said beam, light sensitive means for rotating the shutter device, and stop means on said shutter device and limiting rotation thereof to beam interrupting and non-interrupting positions.

6. A control device comprising a thermal switch, means for directing a concentrated beam of radiant heat upon the switch, a wall insulating and isolating the heat means and switch but having an opening to pass said heat beam, a shutter device movable across said opening and spring set to normally close the opening, and means for moving the shutter device away from said opening.

7. A control device comprising a thermal switch, means for directing a concentrated beam of radiant heat upon the switch, a wall insulating and isolating the heat means and relay but having an opening to pass said heat beam, a shutter device movable across said opening and spring set to normally close the opening, an electrically energized means for adjusting the shutter device, and a self generating light sensitive device for energizing and controlling the said shutter adjusting means.

8. A circuit control device, comprising a thermal switch, means for directing a beam of heat upon the switch for moving the same from an initial position to an actuated position, a shutter device rotatably mounted between the heat source and switch, a spring connected to the shutter device to normally hold the same in a position shielding the switch from the heat beam, and a light sensitive means for moving the shutter to a position clearing the path of the heat beam.

ADOLPH RONNING.